United States Patent
Uchida et al.

(10) Patent No.: US 10,962,198 B2
(45) Date of Patent: Mar. 30, 2021

(54) REFLECTOR HAVING TRAY SHAPES

(71) Applicant: TORAY INDUSTRIES, INC., Tokyo (JP)

(72) Inventors: Hirohito Uchida, Otsu (JP); Yasushi Takada, Otsu (JP); Takashi Isozaki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/494,685

(22) PCT Filed: Feb. 26, 2018

(86) PCT No.: PCT/JP2018/006951
§ 371 (c)(1),
(2) Date: Sep. 16, 2019

(87) PCT Pub. No.: WO2018/180098
PCT Pub. Date: Oct. 4, 2018

(65) Prior Publication Data
US 2020/0011505 A1 Jan. 9, 2020

(30) Foreign Application Priority Data
Mar. 31, 2017 (JP) .............................. JP2017-070198

(51) Int. Cl.
*F21V 7/04* (2006.01)
*F21V 7/28* (2018.01)
(Continued)

(52) U.S. Cl.
CPC ................. *F21V 7/04* (2013.01); *F21V 7/10* (2013.01); *F21V 7/28* (2018.02);
(Continued)

(58) Field of Classification Search
CPC ........... G02F 1/133605; B32B 2250/03; F21V 7/0083
See application file for complete search history.

(56) References Cited

U.S. PATENT DOCUMENTS

2007/0159849 A1* 7/2007 Sakai ................ G02F 1/133605
362/612
2008/0130295 A1* 6/2008 Ueda .................... G02B 5/0268
362/346
(Continued)

FOREIGN PATENT DOCUMENTS

JP 2004-102119 A 4/2004
JP 2012-22089 A 4/2004
(Continued)

OTHER PUBLICATIONS

Machine translation of JP2012022089 retrieved from ESPACENET. (Year: 2020).*

(Continued)

*Primary Examiner* — Alexander K Garlen
*Assistant Examiner* — Colin J Cattanach
(74) *Attorney, Agent, or Firm* — Birch, Stewart, Kolasch & Birch, LLP

(57) ABSTRACT

There is provided a reflector having tray shapes excellent in shape retention, specifically, a reflector having tray shapes which change little even when exposed to a moist heat environment for a long period of time and is suitable for a direct type backlight unit, an LED lighting unit, and an illumination for a plant factory.

9 Claims, 9 Drawing Sheets

(51) Int. Cl.
*F21V 7/10* (2006.01)
*G02F 1/13357* (2006.01)
*C08G 63/16* (2006.01)
*C08L 67/02* (2006.01)
*C08G 63/12* (2006.01)

(52) U.S. Cl.
CPC .... *G02F 1/133605* (2013.01); *B32B 2250/03* (2013.01); *C08G 63/12* (2013.01); *C08G 63/16* (2013.01); *C08L 67/02* (2013.01); *G02F 1/133603* (2013.01)

(56) References Cited

U.S. PATENT DOCUMENTS

| | | | | |
|---|---|---|---|---|
| 2008/0259473 | A1* | 10/2008 | Ueda | G02B 6/0055 359/839 |
| 2010/0165472 | A1* | 7/2010 | Hamasaki | G02B 5/10 359/627 |
| 2010/0284190 | A1* | 11/2010 | Oide | F21V 7/0083 362/282 |
| 2011/0063850 | A1* | 3/2011 | Oide | F21K 9/68 362/296.01 |
| 2016/0231623 | A1* | 8/2016 | Baek | G02F 1/133605 |
| 2017/0122529 | A1* | 5/2017 | Yamada | F21V 1/17 |
| 2018/0023784 | A1* | 1/2018 | Tamura | G02F 1/133602 362/235 |
| 2018/0080625 | A1* | 3/2018 | Yamada | G02F 1/133606 |

FOREIGN PATENT DOCUMENTS

| | | |
|---|---|---|
| JP | 2006-220820 A | 8/2006 |
| JP | 2011-109921 A | 6/2011 |
| WO | WO -2012114896 A1 * | 8/2012 |

OTHER PUBLICATIONS

English Translation of Written Opinion of PCT/JP2018/006951 retrieved from Global Dossier. (Year: 2020).*

Machine translation of JP2004102119A retrieved from ESPACENET. (Year: 2020).*

Machine translation of JP2006220820A retrieved from ESPACENET. (Year: 2020).*

International Search Report, issued in PCT/JP2018/006951, PCT/ISA/210, dated May 22, 2018.

Written Opinion of the International Searching Authority, issued in PCT/JP2018/006951, PCT/ISA/237, dated May 22, 2018.

* cited by examiner

REFLECTOR HAVING TRAY SHAPES

TECHNICAL FIELD

The present invention relates to a reflector having tray shapes, which is suitably used as a component of a direct-type backlight unit, an LED lighting unit, an illumination for a plant factory, and the like.

BACKGROUND ART

In recent years, many displays using liquid crystal have been used as display devices such as personal computers, televisions, smartphones, tablets, and mobile phones. Since these liquid crystal displays themselves are not light emitters, display is possible by providing a surface light source called backlight from the back side and irradiating light. In addition, the backlight has a surface light source structure called edge light type or direct type, in order to meet the requirement not only that the backlight simply irradiates the entire screen with light but also that the backlight should uniformly irradiates the entire screen with light. Among them, a backlight of an edge light type, that is, a type of radiating light from the side to the screen is applied to thin liquid crystal display applications used in notebook computers, monitors, tablets, etc. where thinness and miniaturization are desired. On the other hand, in the case of a large screen such as a liquid crystal television, a backlight of a direct type, that is, a type of radiating light from the back side to the screen is applied.

High light reflection performance is required for lamp reflectors and reflectors used in surface light sources for such liquid crystal screens (hereinafter sometimes collectively referred to as reflective films, surface light source reflective members, etc.), and conventionally a film to which white pigments are added or a film that contains fine air bubbles inside is used alone or one obtained by laminating these films with a metal plate, a plastic plate, etc. have been used. In particular, the film that contains fine air bubbles inside is widely used because it has an effect of improving the luminance and a certain effect of uniformizing the screen luminance (Patent Documents 1 and 2).

A large-screen TV with a direct-type backlight is equipped with a function called "local dimming". It is a technology capable of displaying a clearer image with higher contrast in such a manner that the liquid crystal backlight is finely divided, and the backlight is partially driven in accordance with the brightness of the displayed image to generate brightness to each section. As a technical problem of "local dimming", there is a problem that, when the brightness difference between adjacent LEDs is large, light leaks to the adjacent region, and the effect is weakened. Moreover, in the direct-type backlight, there may be a case where unevenness occurs in which only the portions corresponding to the LEDs are brightened depending on the configuration.

As a measure to solve these problems, a light reflector (Patent Document 3) or the like having a concave light reflection surface can be used, but a foam sheet has a problem that voids are easily crushed when a load is applied during forming.

PRIOR ART DOCUMENT

Patent Documents

Patent Document 1: Japanese Patent Laid-open Publication No. 2003-160682
Patent Document 2: Japanese Examined Patent Publication No. 8-16175
Patent Document 3: Japanese Patent Laid-open Publication No. 2012-022089

SUMMARY OF THE INVENTION

Problems to be Solved by the Invention

An object of the present invention is to solve the above-mentioned problems and to provide a reflector suitable for a component of a direct-type backlight unit, an LED lighting unit, an illumination for a plant factory, and the like.

Solutions to the Problems

As a result of intensive studies on such problems by the present inventors, the following configurations are provided.
(1) A reflector including a plurality of independent tray shapes with a depth of 1 mm or more and 20 mm or less, in which a ratio d/D of a minimum thickness d to a maximum thickness D is 0.5 or more and 0.9 or less.
(2) The reflector according to the item (1), in which a ratio of a bottom portion to a horizontal projected area of a smallest square or rectangle surrounding one independent tray shape is 30% or more.
(3) The reflector according to the item (1) or (2), in which a specific gravity is 0.5 or more and 1.1 or less.
(4) The reflector according to any one of the items (1) to (3), in which the reflector contains air bubbles including nuclei of inorganic particles.
(5) The reflector according to any one of the items (1) to (4), in which a main component is polyester.
(6) The reflector according to the item (5), in which the polyester is copolymerized polyester, and a diol component contains 1 to 20 mol % of 2,2-dimethyl-1,3-propanediol (neopentyl glycol).
(7) The reflector according to any one of the items (1) to (6), in which the reflector includes at least three layers.
(8) The reflector according to any one of the items (1) to (7), in which the reflector is used in an LED lighting unit.
(9) The reflector according to any one of the items (1) to (7), in which the reflector is used in a direct-type LED backlight unit.
(10) The reflector according to any one of the items (1) to (8) in which the reflector is used in a reflective member for an illumination for a plant factory.
(11) The reflector according to any one of the items (4) to (10), in which a content of inorganic particles in 100% by mass of the reflector is 5% by mass or more.
(12) The reflector according to the item (11), in which the reflector contains a thermoplastic resin (B) incompatible with polyester and inorganic particles, and a total amount of the thermoplastic resin (B) and the inorganic particles in 100% by mass of the reflector is 30% by mass or less.

Effects of the Invention

According to the present invention, it is possible to provide a reflector having tray shapes excellent in shape retention. Specifically, it is possible to provide a reflector having tray shapes, which changes little even when exposed to a moist heat environment for a long period of time and is suitable for a direct type backlight unit, an LED lighting unit, and an illumination for a plant factory.

EMBODIMENTS OF THE INVENTION

As a result of intensive studies on such problems, the present inventors have found that it is important that deformation and shrinkage of a reflector due to heat be small, and have arrived at the present invention. When a reflector provided with a shape is applied to improve a contrast ratio of a direct-type backlight unit and eliminate unevenness, the shape is optically optimized by fine calculation. The reflector is exposed to heat from an electrical circuit or an LED after being incorporated into the direct type backlight unit. At this time, if the reflector cannot retain the shape, the effects of the improvement of the contrast ratio and the elimination of the unevenness are diminished.

According to intensive studies on such problems, the present inventors have found that it is important that a reflector have a plurality of independent tray shapes with a depth of 1 mm or more and 20 mm or less, and a ratio d/D of a minimum thickness d to a maximum thickness D is 0.5 or more and 0.9 or less.

[Film Composition]

Figure 1:
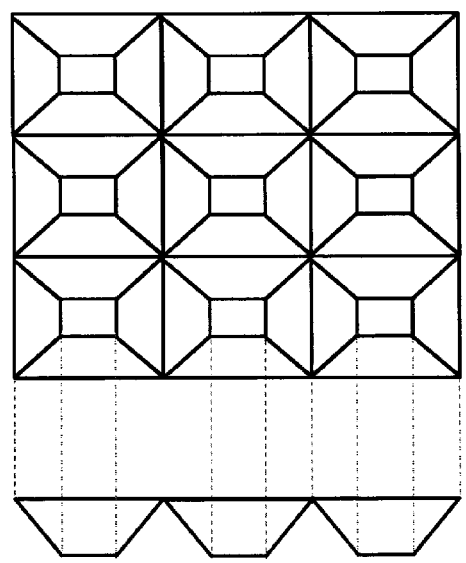
FIG. 1 is a conceptual view illustrating an example of tray shapes in the present invention.

A reflector of the present invention has a plurality of independent tray shapes. By placing LEDs at the bottoms of trays and controlling them independently, it is possible to increase the brightness contrast with the LEDs located at the bottoms of other trays. Here, the tray shape refers to a shape including a bottom portion and an edge continuous therefrom in which the height of the edge is higher than that of the bottom portion. An example of the tray shape in the present invention is illustrated in FIG. 1. The plurality of tray shapes may be the same or different from each other, but preferably are the same. Preferably, each tray shape is independent of the adjacent tray shape by the edge. Here, "independent" refers to a shape in which the bottom portion is set separately. Therefore, for example, when a part is connected like a dumbbell shape, it cannot be said that they are independent. In this case, they are regarded as one tray shape collectively.

Further, the bottom portion refers to a shape of a portion lower than the edge in which all around are surrounded by the edge higher than the bottom portion. In addition, the detail of a measuring method of the area of the bottom portion is mentioned later.

Here, the shape in which the edge is higher than the bottom portion refers to a shape in which the bottom portion is recessed from a white film forming the reflector of the present invention with reference to the film of the white color, and the edge surrounding the bottom portion is higher than the bottom portion. The shape of the bottom portion in the tray shape is not particularly limited as long as it is a concave shape that is lower than the edge, and may be a shape in which the bottom portion has a bottom parallel to the white film (for example, a frustum shape) or a shape that does not have a bottom parallel to the white film (for example, a semi-cylindrical shape or a hemispherical shape). However, in consideration of arranging the LED on the bottom of the tray shape, it is more preferable that the bottom portion has a bottom parallel to the white film.

Further, the shape of the edge surrounding the bottom portion is not limited as long as it is higher than the bottom portion, but it is more preferable that the height of the edge be even. That is, a shape in which the height of the edge is uniform is more preferable than a shape in which a specific portion of the edge is higher or lower than the other portion of the edge, because the effect of local dimming is more easily exhibited.

The depth of the tray shape is 1 mm or more and 20 mm or less. When the depth of the tray shape is less than 1 mm, light may leak to the next. In addition, when the depth of the tray exceeds 20 mm, the width of a television using the reflector of the present invention may be increased. The depth of the tray shape is more preferably 2 mm or more and 15 mm or less, still more preferably 2.5 mm or more and 12 mm or less, and particularly preferably 3 mm or more and 10 mm or less.

Figure 2:
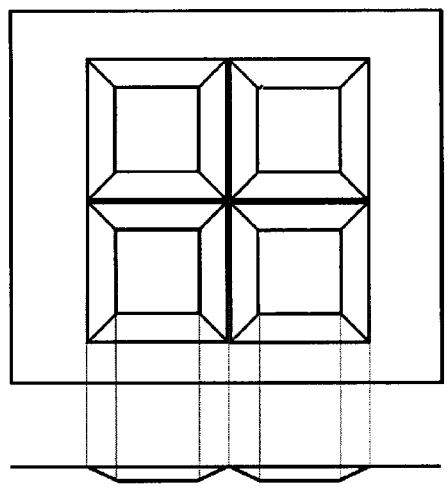
FIG. 2 is a conceptual view illustrating an example in which the tray shapes are each a quadrangular frustum shape.
Figure 3:
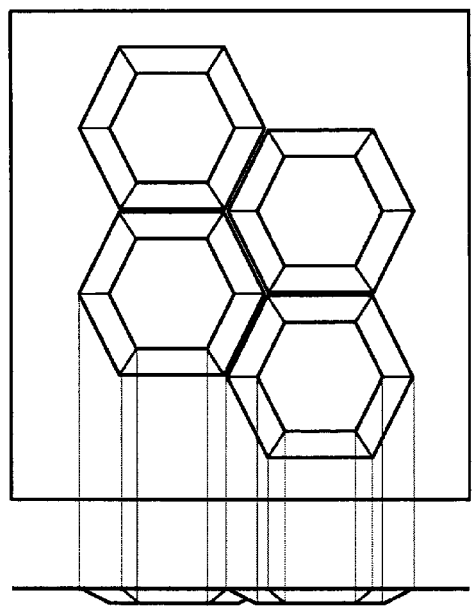
FIG. 3 is a conceptual view illustrating an example in which the tray shapes are each a hexagonal frustum shape.
Figure 4:
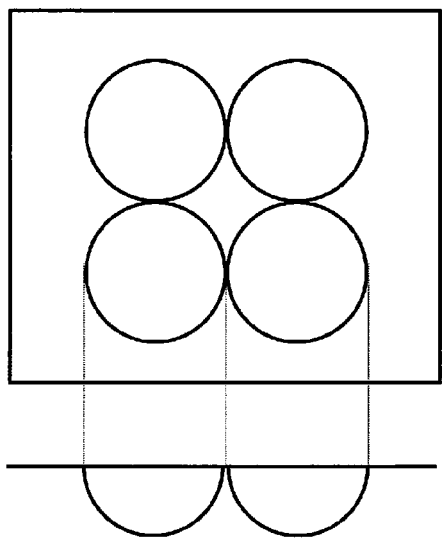
FIG. 4 is a conceptual view illustrating an example in which the tray shapes are each a hemispherical shape.
Figure 5:
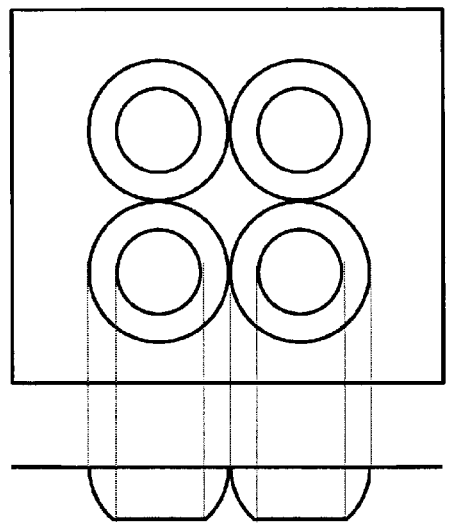
FIG. 5 is a conceptual view illustrating an example in which the tray shapes are each a spherical crown shape.
Figure 6:
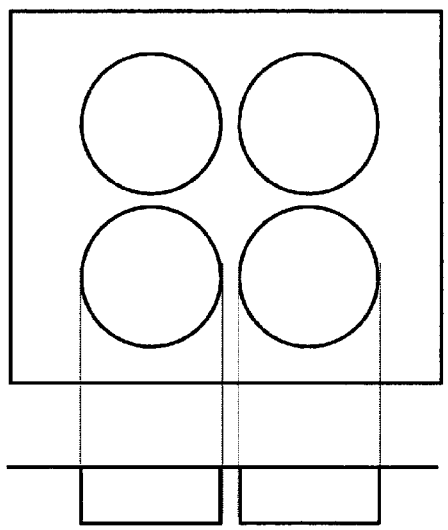
FIG. 6 is a conceptual view illustrating an example in which the tray shapes are each a cylindrical shape.
Figure 7:
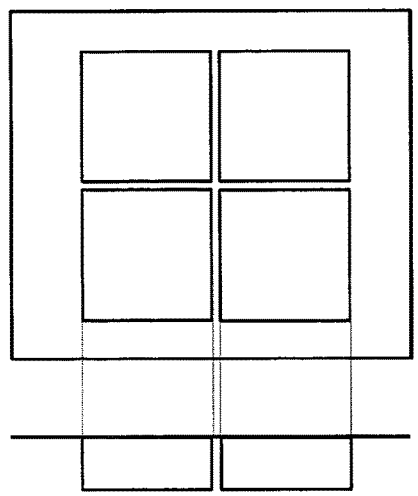
FIG. 7 is a conceptual view illustrating an example in which the tray shapes are each a quadrangular prism shape.
Figure 8:
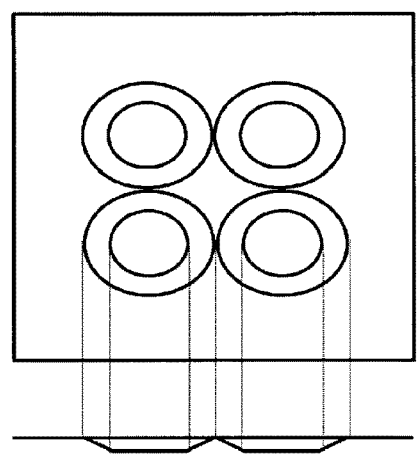
FIG. 8 is a conceptual view illustrating an example in which the tray shapes are each an oval shape.
Figure 9:
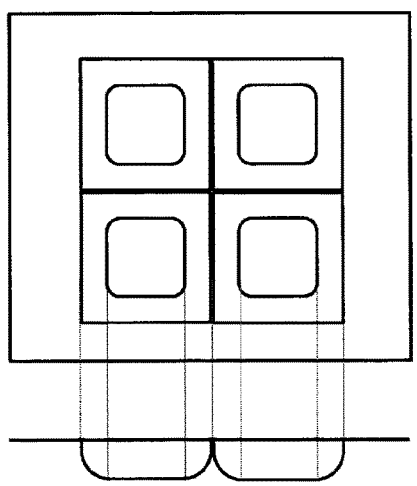
FIG. 9 is a conceptual view illustrating an example in which the tray shapes are each a rounded quadrangular prism shape.
Figure 10:
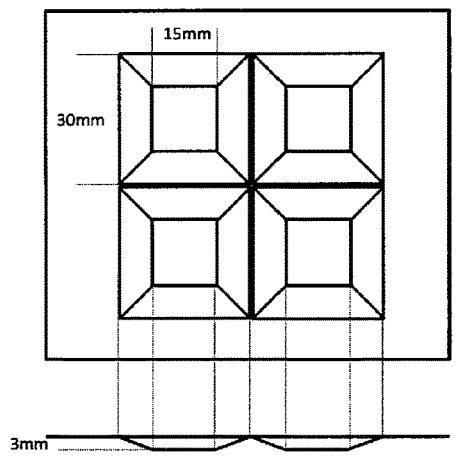
FIG. 10 is a conceptual view illustrating tray shapes of (A) in an embodiment and a reference example.
Figure 11:
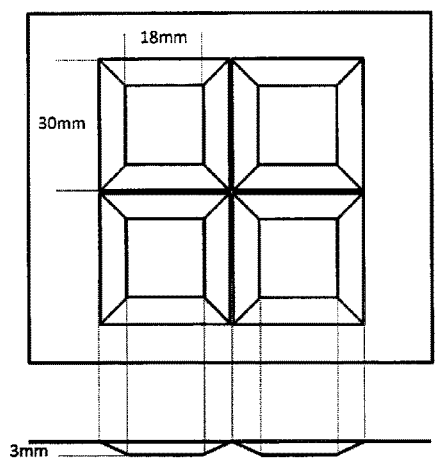
FIG. 11 is a conceptual view illustrating tray shapes of (B) in an embodiment and a reference example.
Figure 12:
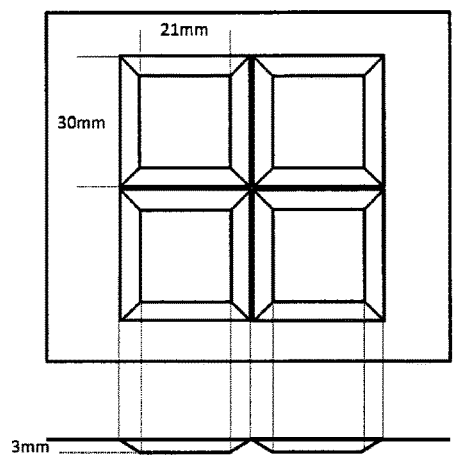
FIG. 12 is a conceptual view illustrating tray shapes of (C) in an embodiment and a reference example.
Figure 13:
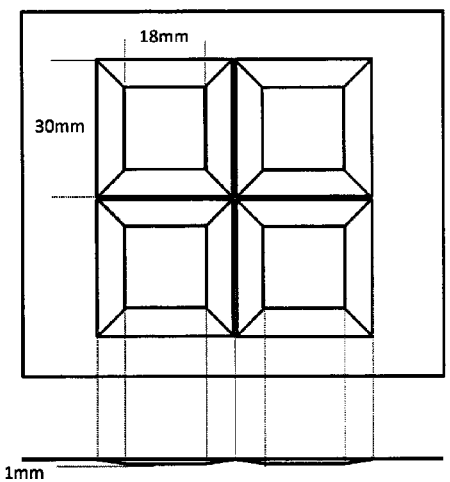
FIG. 13 is a conceptual view illustrating tray shapes of (D) in an embodiment and a reference example.
Figure 14:
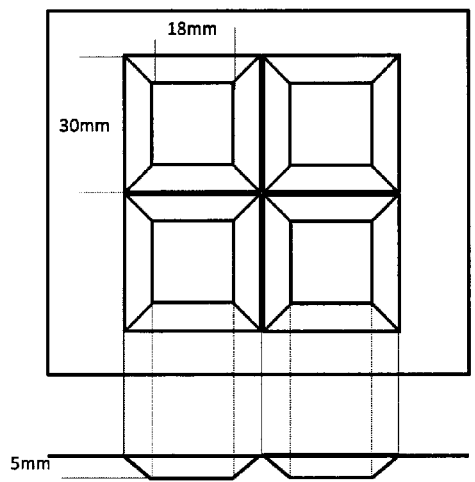
FIG. 14 is a conceptual view illustrating tray shapes of (E) in an embodiment and a reference example.
Figure 15:
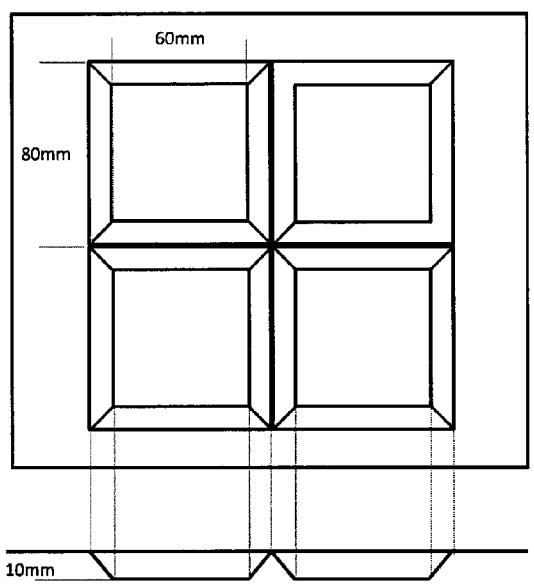
FIG. 15 is a conceptual view illustrating tray shapes of (F) in an embodiment and a reference example.
Figure 16:
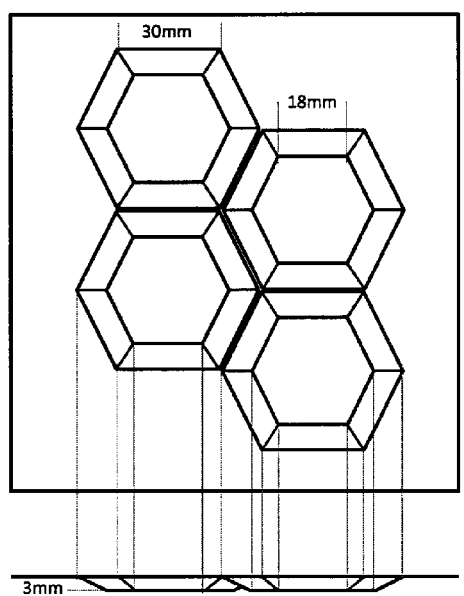
FIG. 16 is a conceptual view illustrating tray shapes of (G) in an embodiment and a reference example.
Figure 17:
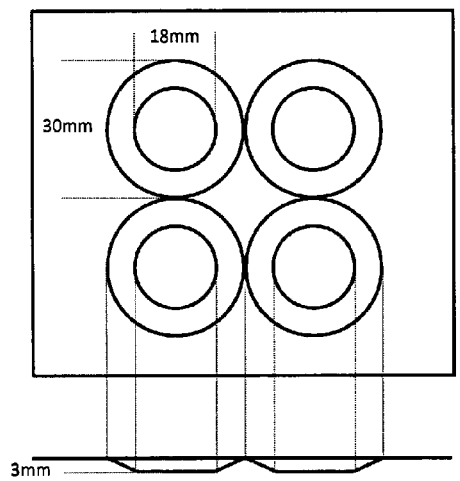
FIG. 17 is a conceptual view illustrating tray shapes of (H) in an embodiment and a reference example.
Figure 18:
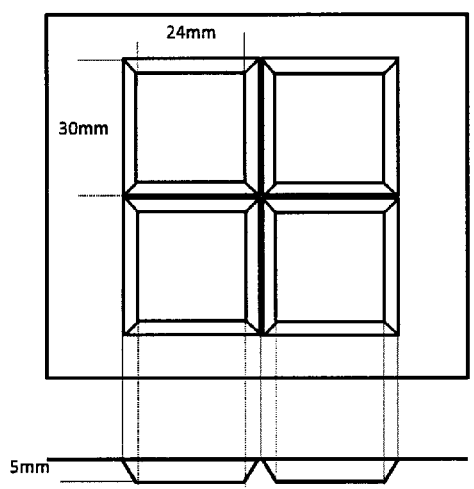
FIG. 18 is a conceptual view illustrating tray shapes of (I) in an embodiment and a reference example.
Figure 19:
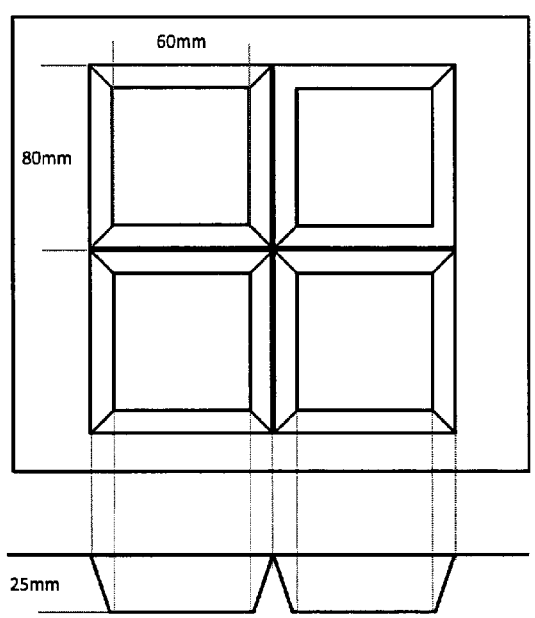
FIG. 19 is a conceptual view illustrating tray shapes of (J) in an embodiment and a reference example.

Although the tray shape is not particularly limited, it may be a frustum shape (FIGS. 2 and 3), a hemispherical shape (FIG. 4), a spherical crown shape (FIG. 5), a columnar shape (FIGS. 6 and 7), a combination thereof, an intermediate shape, a shape distorted to have an oval shape (FIG. 8), or a rounded shape with rounded corners (FIG. 9). Among them, a quadrangular frustum shape (FIG. 2) and a hexagonal frustum shape (FIG. 3) are preferable because they are easy to fill a screen with the same shape and easily reflect light to the screen side.

The size of the tray shape in the horizontal direction is preferably such that the independent tray shape fits in a square of 10 mm to 100 mm. If the size is smaller than the square of 10 mm, the number of required LEDs may be excessive. If it is larger than the square of 100 mm, the region of a partially driven backlight may become large. The tray shape having a depth of 1 mm or more and 20 mm or less can be obtained by, for example, forming a film or sheet used as a reflector.

A forming method is not particularly limited, but there can be employed generally known forming methods such as methods of forming only a film including vacuum forming, pressure forming, vacuum and pressure forming, press forming, and plug-assist vacuum and pressure forming, and forming methods with a base material including insert forming, a three dimension overlay method (TOM), and three dimensional laminate forming. Among them, a forming method in which the mold is not in contact with a reflective surface, such as vacuum forming, pressure forming, or vacuum and pressure forming, is more preferable. When the mold is in contact with the reflecting surface, the surface roughness of the reflector may not be sufficiently controlled. In the present invention, one having a thickness of 400 μm or less is referred to as a "film", and one having a thickness of more than 400 μm is referred to as a "sheet". The reflector of the present invention may be either a film or a sheet.

In the reflector of the present invention, a ratio d/D of a minimum thickness d to a maximum thickness D is 0.5 or more and 0.9 or less. If the thickness ratio d/D is less than 0.5, the strength of the thin portion may be reduced. If the thickness ratio d/D is more than 0.9, the shape of the tray may not be formed sufficiently as designed. In order to make thickness ratio into this range, a white film manufactured by a manufacturing method described later is preferably formed by the method described above.

In the reflector of the present invention, the ratio of the bottom portion to the horizontal projected area of the smallest square or rectangle surrounding one independent tray shape is preferably 30% or more. More preferably, it is 35% or more, and more preferably 40% or more. If it is less than 30%, the angle of the side portions is shallow, the ridge portion formed by the adjacent tray shapes tends to be wide, and when a reflector having a plurality of tray shapes is incorporated into a backlight, the space between the two tray shapes may be dark. The upper limit is not particularly limited, but it is preferably 70% or less. If the ratio of the bottom portion exceeds 70%, the side surface portions become close to perpendicular to the bottom portion, and it may be easy to create a place where a large load is applied to the reflector due to the shape. The horizontal projected area of the smallest square or rectangle surrounding one independent tray shape is the apparent area when the square or rectangle is observed from directly above. The horizontal projected area of the smallest square or rectangle surrounding one independent tray shape can be rephrased as the area of the tray shape when the formed product is regarded as being horizontal without considering the unevenness of the formed product.

The reflector of the present invention preferably has through holes in order to arrange the LEDs on the bottom portions of the tray shape. The size and shape of the holes are not particularly limited as long as the size and shape of the holes do not adversely affect the arrangement of the LEDs, but if the size is too large, the reflection performance may be deteriorated. The hole preferably has a size that fits in the bottom portion. Specifically, the size and the shape are preferably larger than the square of 1 mm and fit in the square of 30 mm. If the size and the shape are smaller than the square of 1 mm, it may not be possible to secure a sufficient size for arranging the LED. The number of through holes may be one or more in one tray shape, or the through holes may be in the middle portions of the plurality of tray shapes or the side portions.

The reflector of the present invention preferably has a shrinkage factor of 10% or less in each of the depth direction in the tray and the planar direction at the time of heat treatment at 90° C. for 30 minutes. More preferably, they are each 5% or less, and more preferably 2% or less. If the shrinkage factor in the depth direction is more than 10%, light may not be reflected as in the optical design. In addition, if the reflector shrinks by more than 10% in the horizontal direction, the positions of the LEDs may not be aligned with the positions of the through holes. As a preferable method for making the shrinkage factor into 10% or less, it is preferable to form the white film manufactured by the manufacturing method described later by the method described above.

The reflector of the present invention preferably has a surface roughness Ra of less than 100 nm. It is more preferably less than 80 nm and even more preferably less than 50 nm. It is preferable to make the surface roughness Ra less than 100 nm, for example, since light is easily specularly reflected. If the surface roughness Ra is 100 nm or more, the optical design may be affected. The method for setting the surface roughness Ra to the above range is not particularly limited, but it is possible by, for example, preparing a reflector having a three-layer structure as described later and adjusting the particle size and the compounding amount of particles added to the surface layer.

The reflector of the present invention preferably has a specific gravity of 0.5 or more and 1.1 or less. More preferably, it is 0.6 or more and 1.05 or less, and still more preferably, 0.7 or more and 1.0 or less. If the specific gravity is less than 0.5, the strength of the tray shape may be insufficient. If the specific gravity is more than 1.1, it may be difficult to sufficiently increase the reflectance of the reflector.

There is no particular limitation for setting the specific gravity in such a range, but a method of causing air bubbles to be contained in the inside of the reflector is preferably used. As a method of causing air bubbles to be contained inside, there are given (1) a method of causing a thermoplastic resin (A) to contain a foaming agent, and forming air bubbles by heating at the time of extrusion or film formation or forming air bubbles by chemical decomposition, (2) a method of adding gas or vaporizable substances during extrusion of the thermoplastic resin (A), and (3) a method of adding inorganic particles and/or a thermoplastic resin (B) incompatible with the resin to the thermoplastic resin (A) and uniaxially or biaxially stretching it to generate fine air bubbles. In the present invention, it is preferable to use the above method (3) in terms of film forming property, ease of adjustment of the amount of air bubbles contained inside, manufacturing cost, and the like.

As the inorganic particles in the method (3) above, there are given, silica, colloidal silica, calcium carbonate, aluminum silicate, calcium phosphate, alumina, magnesium carbonate, zinc carbonate, titanium oxide, zinc oxide, antimony oxide, cerium oxide, zirconium oxide, tin oxide, lanthanum oxide, magnesium oxide, barium carbonate, basic lead carbonate (lead white), barium sulfate, calcium sulfate, lead sulfate, zinc sulfide, mica, mica titanium, talc, clay, kaolin, and the like. Further, they can be used alone or in combination of two or more, and among them, barium sulfate particles, titanium dioxide particles, and calcium carbonate are particularly preferable because film formation stability can be obtained with high optical characteristics.

When air bubbles are contained by the inorganic particles, the inorganic particles are preferably contained in an amount of 1 to 50% by mass in the total mass of the reflector of the present invention. When the inorganic particles are less than 1% by mass, it may be difficult to set the specific gravity to 1.1 or less, and when the inorganic particles are more than 50% by mass, the mechanical strength, the heat resistance, and the manufacturing cost of the thermoplastic resin (A) may be reduced. More preferably, it is 3 to 40% by mass, and still more preferably 5 to 29% by mass.

When fine air bubbles are generated by adding the thermoplastic resin (B) incompatible with the resin to the thermoplastic resin (A) and uniaxially or biaxially stretching it, the thermoplastic resin (A) is preferably a polyester resin. Preferred modes of the polyester resin are described below. The polyester resin refers to a polymer having an ester bond in the main chain, but the polyester resin used in the present invention is preferably a polyester resin having a structure in which dicarboxylic acid and diol are subjected to polycondensation. As the dicarboxylic acid component, there can be given, for example, aromatic dicarboxylic acids such as terephthalic acid, isophthalic acid, phthalic acid, 2,6-naphthalenedicarboxylic acid, diphenyldicarboxylic acid, diphenylsulfonedicarboxylic acid, diphenoxyethanedicarboxylic acid, and 5-sodium sulfone dicarboxylic acid; aliphatic dicarboxylic acids such as oxalic acid, succinic acid, adipic acid, sebacic acid, dimer acid, maleic acid, and fumaric acid; alicyclic dicarboxylic acid such as 1,4-cyclohexanedicarboxylic acid; and oxycarboxylic acid such as parahydroxybenzoic acid. Moreover, as a dicarboxylic acid ester derivative component, there can be given an esterified product of the above dicarboxylic acid compound, such as dimethyl terephthalate, diethyl terephthalate, 2-hydroxyethyl methyl terephthalate, dimethyl 2,6-naphthalene dicarboxylate, dimethyl isophthalate, dimethyl adipate, diethyl maleate, dimethyl dimerate, and the like. Further, as the diol component, there are given, for example, aliphatic dihydroxy compounds such as ethylene glycol, 1,2-propanediol, 1,3-propanediol, 1,3-butanediol, 1,4-butanediol, 1,5-pentanediol, 1,6-hexanediol, and 2,2-dimethyl-1,3-propanediol (neopentyl glycol); polyoxyalkylene glycols such as diethylene glycol, polyethylene glycol, polypropylene glycol, and polytetramethylene glycol; alicyclic dihydroxy compounds such as 1,4-cyclohexane dimethanol and spiro glycol; and aromatic dihydroxy compounds such as bisphenol A and bisphenol S. Each of these may be used alone or in combination of two or more. A copolymerized polyester resin may be used as the polyester resin used in the present invention. The copolymerized polyester is preferably copolymerized with two or more among the dicarboxylic acid components listed above of the polyester resin and/or two or more among the diol components listed above of the polyester resin. As a method of introducing the copolymerization component, the copolymerization component may be added at the time of polymerization of polyester pellets which are a raw material, and it may be used as pellets in which the copolymerization component is polymerized in advance, or there may be employed a method of supplying a mixture of independently polymerized pellets like polyethylene terephthalate and polyethylene terephthalate pellets to an extruder and copolymerizing them by transesterification reaction at the time of melting. In addition, one in which small amounts of trimellitic acid, pyromellitic acid, and an ester derivative thereof are copolymerized may be used as long as the film forming property is not affected as the film.

In addition, the polyester resin may contain a resin compatible with the polyester (A) resin other than the polyester resin in an amount of 5% by mass or less in the total mass of the resin component, as long as the object of the present invention is not impaired.

As the thermoplastic resin (B) incompatible with the polyester resin, there is selected polyethylene, polypropylene, polybutene, poly 4-methylpentene-1 (hereinafter sometimes abbreviated as "polymethylpentene" or "PMP"), an olefin resin such as cyclic olefin, a styrene resin, a polyacrylate resin, a polycarbonate resin, a polyacrylonitrile resin, a polyphenylene sulfide resin, a fluorine resin, or the like. Among them, an olefin resin or a styrene resin is preferable. As the olefin resin, polyethylene, polypropylene, polymethylpentene, ethylene-propylene copolymer, ethylene-butene-1 copolymer, cyclic olefin, and the like are preferable. As the styrene resin, polystyrene, polymethylstyrene, polydimethylstyrene, and the like are preferable. These may be homopolymers or copolymers, and two or more thermoplastic resins (B) may be used in combination. The thermoplastic resin (B) is preferably contained in an amount of 1 to 50% by mass in the total mass of the reflector of the present invention. When the thermoplastic resin (B) is less than 1% by mass, it may be difficult to set the specific gravity to 1.1 or less, and when the thermoplastic resin (B) is more than 50% by mass, the mechanical strength, the heat resistance, and the manufacturing cost of the polyester resin may be reduced. More preferably, it is 1 to 30% by mass, and still more preferably 1 to 25% by mass.

As a method of determining the mass ratio of the polyester resin and the thermoplastic resin (B), a method of combining a plurality of analyzes according to the type of each resin can be considered. There can be used a method of removing only the polyester resin with a solvent and separating the remaining thermoplastic resin (B) with a centrifuge, to thereby determine the mass ratio from the mass of the obtained residue, or a method of, after identifying each resin by infrared spectroscopy (IR), $^1$H-NMR, or $^{13}$C-NMR, dissolving the polyester resin and the thermoplastic resin (B) in a solvent in which both the polyester resin and the thermoplastic resin (B) are soluble, removing the impurities and inorganic substances by centrifugation, and determining the concentration by absorbance, to thereby determine the mass ratio. As a solvent in which the polyester resin is soluble, trifluoroacetic acid, 1,1,1,3,3,3-hexafluoro-2-propanol, o-chlorophenol, or the like is used.

The reflector of the present invention is preferably a reflector containing air bubbles including nuclei. By containing the air bubbles, it is possible to improve the reflection performance as the reflector, and by including the nuclei, it becomes easy to maintain the air bubbles without crushing during forming. The air bubbles containing the nuclei can be obtained by adding the above-mentioned inorganic particles or thermoplastic resin (B) incompatible with the resin to the above-mentioned thermoplastic resin (A), and uniaxially or biaxially stretching it to generate fine air bubbles in which inorganic particles or thermoplastic resin (B) serves as nuclei. In the case of air bubbles without nuclei, although the reflection performance can be improved, the air bubbles may be crushed during forming.

The reflector of the present invention is more preferably a reflector containing air bubbles including nuclei of inorganic particles. As the inorganic particles serve as the nuclei, the air bubbles are less likely to be crushed even at high temperature during forming. The inorganic particles may be used alone or in combination with the thermoplastic resin (B). The inorganic particles which serve as the nuclei preferably have a number average particle diameter of 0.1 to 3 μm. If it is less than 0.1 μm, air bubbles may be difficult to generate, and even if they are generated, they may be easily crushed. If it is larger than 3 μm, the productivity may be reduced. More preferably, the thickness is 0.2 to 2 μm, and still more preferably 0.3 to 1 μm.

In the reflector of the present invention, the content of the inorganic particles in 100% by mass of the reflector is preferably 5% by mass or more. More preferably, it is 10% by mass or more. When the content of the inorganic particles is 5% by mass or more, for example, the air bubbles are less likely to be crushed even at high temperature during forming. When the content of the inorganic particles is less than 5% by mass, the effect of making the air bubbles difficult to be crushed may not be sufficiently obtained.

The reflector of the present invention preferably contains the thermoplastic resin (B) incompatible with polyester and the inorganic particles, and the total amount of the thermoplastic resin (B) and the inorganic particles in 100% by mass of the reflector is preferably 30% by mass or less. If the total amount of the thermoplastic resin (B) incompatible with polyester and the inorganic particles is more than 30% by mass, the productivity may be reduced.

The main component of the reflector of the present invention is preferably polyester. If polyester is at least 50% by mass or more in the resin constituting the reflector, it can be said to be the main component. If the polyester is less than 50% by mass, the heat resistance and the productivity may be reduced.

In the reflector of the present invention, the polyester is preferably copolymerized polyester, and the diol component contains 1 to 20 mol % of 2,2-dimethyl-1,3-propanediol (neopentyl glycol). More preferably, it is 2 to 15 mol %, and further preferably 3 to 12 mol %. By containing 1 mol % or more of 2,2-dimethyl-1,3-propanediol in the diol component, the effect of stabilizing the formability and the shape can be obtained. If it is less than 1 mol %, the effect may not be obtained sufficiently. Moreover, if it is more than 20 mol %, the heat resistance may be reduced.

The reflector of the present invention may be a reflector including a single layer or a reflector including a plurality of layers, but preferably includes at least three layers. For example, a configuration in which a core layer (Y) containing air bubbles inside and surface layers (X) are laminated in three layers in the order of X/Y/X is preferable. By laminating the surface layers (X) and the core layer (Y) in the order of X/Y/X, high strength may be obtained. The reflector of the present invention may have a configuration of four or more layers, but a three-layer configuration is preferable in consideration of the ease and the strength in film formation. Moreover, the surface layers (X) and the core layer (Y) are preferably stretched in two axial directions after being laminated at once in a film forming line by a co-extrusion method. Furthermore, if necessary, re-longitudinal stretching and/or re-lateral stretching may be performed.

Next, an example of a method for manufacturing a reflector of the present invention will be described, but it is not particularly limited. In a composite film-forming apparatus including two single-screw or twin-screw extruders, a main extruder, and a sub-extruder, a resin being a raw material of the core layer (Y) is charged in the main extruder, and a resin being a raw material of the surface layers (X) is charged in the sub-extruder. Each raw material is preferably dried so as to have a moisture content of 50 ppm or less. Thus, the raw materials can be supplied to the respective extruders, and for example, with the two extruders and a feed block or a multi-manifold installed on the upper portion of a T die, X/Y/X three-layer laminated films can be obtained. The extruded unstretched sheet is cooled and solidified in a close contact state on a cooled drum to obtain an unstretched laminated film. At this time, in order to obtain a uniform film, it is desirable to apply static electricity so as to be in close contact with the drum.

The unstretched film is heated by roll heating, and as necessary, infrared heating or the like to temperature higher than the glass transition temperature (Tg) of the polymer, and stretched in the lengthwise direction (hereinafter referred to as the longitudinal direction) to obtain a longitudinally stretched film. This stretching is performed using the circumferential speed difference of two or more rolls. The factor of the longitudinal stretching is preferably 2 to 6 times and more preferably 3 to 4 times, although depending on the required properties of the application. When it is less than 2 times, the reflectance may be low, and when it is more than 6 times, breakage may easily occur during film formation. The film after longitudinal stretching is subsequently subjected to processes of stretching, heat setting, and heat relaxation sequentially in the direction orthogonal to the longitudinal direction (hereinafter referred to as the lateral direction) to obtain a biaxially oriented film, and those processes are performed while running the film. At this time, it is preferable to perform the preheating and the stretching for the lateral stretching at a temperature equal to or higher than the glass transition temperature (Tg) of the polymer and equal to or lower than (Tg+20° C.). The factor of the lateral stretching is preferably 2.5 to 6 times and more preferably 3 to 4 times, although depending on the required properties of the application. If it is less than 2.5 times, the reflectance may be low. When it exceeds 6 times, breakage may easily occur during film formation. In order to complete the crystal orientation of the obtained biaxially stretched laminated film and to impart planarity and dimensional stability, the film is subsequently subjected to heat treatment in a tenter at a temperature of 180 to 230° C. for 1 to 60 seconds, uniformly cooled gradually, cooled to room temperature, and wound up on a roll. Such heat treatment may be performed while relaxing the film in its lengthwise direction and/or width direction.

Further, although the case of stretching by the sequential biaxial stretching method has been described in detail here as an example, the reflector of the present invention may be stretched by any method of a sequential biaxial stretching method and a simultaneous biaxial stretching method, and further if necessary, re-longitudinal stretching and/or re-lateral stretching may be performed after the biaxial stretching.

In order to impart planar stability and dimensional stability to the biaxially stretched laminated film thus obtained, the film is subsequently subjected to heat treatment (heat setting) in a tenter, uniformly cooled gradually, cooled to about room temperature, and wound up, so that a white film for the reflector of the present invention can be obtained. Furthermore, annealing at 90 to 200° C. is also preferably employed. More preferably, annealing is performed at 140 to 200° C. The method of performing annealing treatment is not particularly limited, but there are given a (off annealing) method of performing heat treatment on a film in an oven installed between a film unwinding roll and a film winding roll, a method of performing heat treatment on a film cut to a required size in an oven, and a method (in-line annealing) of performing annealing treatment in a film forming process of a film. By performing the annealing treatment, residual stress of the film may be released, and shrinkage after forming may be suppressed.

In addition, various coating liquids are applied using known techniques in order to impart slipperiness, antistatic property, ultraviolet light absorption performance, and the like to at least one surface of the white film, or a hard coat layer or the like may be provided in order to improve impact resistance, within the range where the effects of the present invention are not impaired. The coating may be applied at the time of film production (in-line coating) or may be applied on a white film after film production (off-line coating). In the case of coating at the time of film production, such a method is preferable that a coating solution is uniformly coated on a film at least uniaxially stretched using a metaling bar, a gravure roll, or the like, and the coating solution is dried while stretching.

The reflector of the present invention can be obtained by forming a white film, for example, by a forming method described below. A forming method is not particularly limited, but there can be employed generally known forming methods such as methods of forming only a film including vacuum forming, pressure forming, vacuum and pressure forming, press forming, and plug-assist vacuum and pressure forming, and forming methods with a base material including insert forming, a three dimension overlay method (TOM), and three dimensional laminate forming. Among them, a forming method in which the mold is not in contact with a reflective surface, such as vacuum forming, pressure forming, or vacuum and pressure forming, is more preferable. For example, when vacuum and pressure forming is performed, the film is heated with a far infrared heater at 400° C. so that the film surface temperature becomes Tg+50° C. or higher, and vacuum and pressure forming (pressure: 1 MPa) is performed along a mold heated to 50° C., so that the reflector of the present invention can be obtained.

The reflector of the present invention can be suitably used as a reflector for an LED lighting unit. In the case of the LED lighting unit using the reflector of the present invention, light leakage of the adjacent LEDs hardly occurs, which is preferable as a lighting application equipped with a partial drive function. In particular, it is preferable as a reflector for a flat type LED lighting unit.

The reflector of the present invention can be suitably used as a reflector for a direct-type LED backlight unit. In the case of the direct-type LED backlight unit using the reflector of the present invention, light leakage of the adjacent LEDs hardly occurs, which is preferable for a backlight having a local dimming function. In particular, it is preferable as a reflector for a direct-type LED backlight unit used in a liquid crystal display, a liquid crystal television, a liquid crystal monitor, and the like.

The reflector and an optical member of the present invention can be suitably used as a reflective member for an illumination for a plant factory. When the reflector of the present invention is used as a reflective member for an illumination for a plant factory, for example, diffusion of light can be suppressed and directional light can be efficiently radiated to a plant. Alternatively, it is preferable because current and voltage required to obtain the same illuminance can be suppressed, and power consumption and heat generation from a light source can be suppressed.

EXAMPLE

Hereinafter, the present invention will be described in detail by way of examples. Each characteristic value was measured by the following method.

(1) Depth of Tray Shape, Horizontal Projected Area, Dimensional Shrinkage Factor, and Bottom Area The tray shape was measured using Wide-Area 3D Measurement System VR-3200 (manufactured by KEYENCE CORPORATION)

The sample measured once was put into an oven adjusted in temperature at 90° C. and was subjected to treatment for 30 minutes. The shape measurement was similarly performed on the sample after the treatment.

Further, in the VR-3000 Series analysis application, the smallest square or rectangle surrounding one independent tray shape was set in a flat measurement window. Specifically, the outline of the tray shape can be traced by checking the automatic edge extraction and drawing the inside of the edge of the tray shape with a line. The smallest square or rectangle circumscribing this outline is drawn, and the measurement region can be set based on the size and the coordinates of the vertices. If the edges are so smooth that automatic edge extraction cannot be performed, a portion corresponding to the ridges between adjacent tray shapes is determined as the outline of the tray shape to obtain the smallest square or rectangle.

Next, the volume & area measurement window was displayed, the recess was selected in the measurement mode, and the measurement region is set. The measurement region was set to the smallest square or rectangle surrounding one independent tray shape. In the measurement setting, the setting screen of the height threshold was open, the threshold setting bar was manually aligned to overlap the most frequently appearing height on the histogram that indicated the frequency by the height and the length of the bar on the vertical axis, and the height threshold was set to its height+ 0.1 mm. A portion lower than the height threshold was defined as a bottom portion. At this time, an area obtained by viewing a cross-sectional area horizontally cut at the height threshold from the top was defined as a horizontal projected area of the bottom portion. When the through hole was formed at the bottom portion, the area was defined as the horizontal projected area of the bottom portion including the area of the hole. Moreover, although there was a case where the height of a jig for supporting a measurement stage, a casing, and a formed product might be detected due to the through hole, the case was excluded.

Regarding the smallest square or rectangular horizontal projected area surrounding one independent tray shape, in the VR-3000 Series analysis application, the volume & area measurement window was displayed, the recess was selected in the measurement mode, and the measurement region was set.

In the height threshold setting screen, the height threshold was set to the maximum value of the height obtained by the histogram that indicated the frequency mentioned above, so that the area of the portion lower than the threshold could be obtained as the horizontal projected area. The area was displayed as "cross-sectional area" in the analysis application. The "cross-sectional area" was defined as the horizontal projected area of the square or rectangle.

The flat measurement window was displayed for one independent tray shape, and the smallest square or rectangle surrounding the tray shape was set. Next, the midpoint of each side of this square or rectangle was determined. When a straight line extending from one middle point to the middle point of the opposite side was drawn in the opposing sides, a point where the one middle point intersected with the tray shape first was defined as an intersection point of the tray shape. The coordinate heights of the intersection points (four points) of the tray shape thus obtained were read. At this time, the difference between the average of the coordinate heights of the four points and the height threshold set in the volume & area measurement window was defined as the depth of the tray. Also for the sample after heat treatment, the depth of the tray was determined in the same manner, and the dimensional change rate in the depth direction was determined. The dimensional change rate in the horizontal direction was obtained from the distance between the centers of the smallest square or rectangle surrounding one independent tray shape.

(2) Specific Gravity

From the reflector, five square samples with one side of 5 cm observed from above were cut out and each measured using an electronic densimeter SD-120L (manufactured by Mirage Trade Co., Ltd.) based on JIS K7112-1980. The arithmetic average of the measured values of a total of 5 points obtained was determined, and this was defined as the specific gravity of the reflector. In addition, even when a hole was formed in the reflector, and hence the shape was partially cut, it could be measured without a problem.

(3) Maximum Film Thickness D, Minimum Film Thickness d, and d/D

The shortest middle line of the smallest square or rectangle surrounding the tray shape (in the case of the square, and a line segment connecting middle points of opposing sides, and in the case of a rectangle, a line segment connecting middle points of long sides), and a point P on the bottom portion farthest from the center of gravity of the square or the rectangle were set. Using a microtome along the shortest middle line, a cross section perpendicular to the surface direction of the reflector was cut out. Among the cut-out samples, the sample not including the point P was subjected to observation as it was, and regarding the sample including the point P, a cross section perpendicular to the surface direction of the reflector was cut out along the line segment connecting the center of gravity and the point P using a microtome. In the case of the square, the cross section was cut out along the center line overlapping first when a line segment connecting the center of gravity and the point P was rotated clockwise about the center of gravity as a fulcrum. After platinum-palladium was deposited for each, the target region was observed at an arbitrary magnification of 200 to 1,000 times with a field emission scanning electron microscope "JSM-6700F" manufactured by JEOL Ltd., and a cross-sectional observation photograph was obtained. By observing the observation position while shifting the observation position little by little, it was possible to obtain a collection of cross-sectional observation photographs along the entire surface on the line segment connecting the middle line and the center of gravity and the point P. The maximum value and the minimum value of the thickness were determined in each cross-sectional photograph. Among all the maximum values, the thickest point was defined as the maximum thickness D, and the thinnest point of all the minimum values was defined as the minimum thickness d. Here, the thickness was the shortest distance from an arbitrary point on one surface to the other surface on a straight line perpendicular to the surface direction of the reflector on the cross-sectional photograph.

(4) Optical Unevenness

A reflector having 4 squares in 2 rows×2 columns of trays was formed, and a hole of 5 mm in diameter was cut at the center of each square. A lens cap was removed from an LED bar of a commercial TV (manufactured by Haier, LE42A7000), and the reflector was set so that the LEDs could come out of the holes. An optical film group was placed on the reflector, the LEDs were turned on, and the appearance was observed.

⊙: Even between the tray and the tray is bright and optical unevenness cannot be seen ◯: Between the tray and the tray is bright, but the forming shapes can be confirmed X: The optical unevenness which becomes dark between the tray and the tray is visible, and the forming shapes can be confirmed.

XX: The reflectance is reduced so that a part of the tray is transparent, resulting in optical unevenness.

[Used Raw Material]

(1) PET Resin (a)

Polymerization was performed on terephthalic acid and ethylene glycol using antimony trioxide as a catalyst by an ordinary method to obtain polyethylene terephthalic acid (PET). The glass transition temperature of the obtained PET was 77° C., the melting point was 255° C., the intrinsic viscosity was 0.63 dl/g, and the terminal carboxyl group concentration was 40 eq./ton.

(2) Copolymerized Polyester Resin (b)

Polymerization was performed on terephthalic acid, ethylene glycol, and neopentyl glycol using antimony trioxide as a catalyst by an ordinary method to obtain a copolymerized polyester resin (c) containing 17.5 mol % of isophthalic acid residue. The IV was 0.6 dl/g, and the carboxylic acid end group concentration was 33 eq./ton.

(3) Copolymerized Polyester Resin (c)

Polymerization was performed on terephthalic acid, isophthalic acid, and ethylene glycol using antimony trioxide as a catalyst by an ordinary method to obtain a copolymerized polyester resin (c) containing 17.5 mol % of isophthalic acid residue. The IV was 0.55 dl/g, and the carboxylic acid end group concentration was 33 eq./ton.

(4) Copolymerized Polyester Resin (d)

A commercially available cyclohexane dimethanol 33 mol % copolymerized polyester "GN 001" (manufactured by Eastman Chemical Company) was used.

(5) Cyclic Olefin (COC) Resin (e)

A commercially available cyclic olefin resin "TOPAS 6017" (Polyplastics Co., Ltd.) was used.

(6) Barium Sulfate 50 Mass % Master (f)

50 parts by mass of the PET resin (a) and 50 parts by mass of barium sulfate particles (number average particle diameter 0.5 μm) were kneaded by a twin-screw extruder to obtain a barium sulfate 50 mass % master (f).

(7) Calcium Carbonate 50 Mass % Master (g)

50 parts by mass of the PET resin (a) and 50 parts by mass of calcium carbonate particles (number average particle diameter 0.5 μm) were kneaded by a twin-screw extruder to obtain a calcium carbonate 50 mass % master (g).

[Forming Shape]

(A) Tray shapes of 4 squares in 2 rows×2 columns, which are each a quadrangular frustum shape with the size of one tray of 30 mm×30 mm, the depth of 3 mm, and the size of the bottom portion of 15 mm×15 mm.

(B) Tray shapes of 4 squares in 2 rows×2 columns, which are each a quadrangular frustum shape with the size of one tray of 30 mm×30 mm, the depth of 3 mm, and the size of the bottom portion of 18 mm×18 mm.

(C) Tray shapes of 4 squares in 2 rows×2 columns, which are each a quadrangular frustum shape with the size of one tray of 30 mm×30 mm, the depth of 3 mm, and the size of the bottom portion of 21 mm×21 mm.
(D) Tray shapes of 4 squares in 2 rows×2 columns, which are each a quadrangular frustum shape with the size of one tray of 30 mm×30 mm, the depth of 1 mm, and the size of the bottom portion of 18 mm×18 mm.
(E) Tray shapes of 4 squares in 2 rows×2 columns, which are each a quadrangular frustum shape with the size of one tray of 30 mm×30 mm, the depth of 5 mm, and the size of the bottom portion of 18 mm×18 mm.
(F) Tray shapes of 4 squares in 2 rows×2 columns, which are each a quadrangular frustum shape with the size of one tray of 80 mm×80 mm, the depth of 10 mm, and the size of the bottom portion of 60 mm×60 mm.
(G) Honeycomb tray shapes of 4 squares in 2 rows×2 columns, which are each a hexagonal frustum shape with the size of one tray being a regular hexagon of 30 mm at one side, a depth of 3 mm, and a shape of the bottom portion being a regular hexagon of 18 mm at one side.
(H) Tray shapes of squares in 2 rows×2 columns 4, which are each a circular frustum shape with the size of one tray being a circular shape having a diameter of 30 mm, a depth of 3 mm, and a shape of the bottom portion being a circular shape having a diameter of 18 mm.
(I) Tray shapes of 4 squares in 2 rows×2 columns, which are each a quadrangular frustum shape with the size of one tray of 30 mm×30 mm, the depth of 5 mm, and the size of the bottom portion of 24 mm×24 mm.
(J) Tray shapes of 4 squares in 2 rows×2 columns, which are each a quadrangular frustum shape with the size of one tray of 80 mm×80 mm, the depth of 25 mm, and the size of the bottom portion of 60 mm×60 mm.

Examples 1 to 19, Comparative Examples 2 to 4

After the raw materials of the composition shown in Tables 1 and 2 were vacuum-dried at a temperature of 180° C. for 6 hours, the raw material of the core layer (Y) was supplied to the main extruder, melt-extruded at a temperature of 280° C., and then filtered with a 30 μm cut filter. The raw material of the surface layers (X) was supplied to the sub-extruder, melt-extruded at a temperature of 280° C., and then filtered with a 30 μm cut filter. Thereafter, the surface layers (X) were combined so as to be laminated on both surface layers of the core layer (Y) (X/Y/X) in a T die multiple nozzle. The mass ratio of the discharge amounts of the main extruder and the sub-extruder was 4:1.

Then, the resultant was extruded into a molten sheet, and the molten sheet was cooled and solidified in a close contact state on a drum maintained at a surface temperature of 25° C. by an electrostatic application method to obtain an unstretched film. Subsequently, the unstretched film was preheated by a roll group heated to a temperature of 80° C. Then, while radiating an infrared heater from both sides, the film is stretched 3.3 times in the lengthwise direction (longitudinal direction) and cooled by the roll group at a temperature of 25° C. to obtain a uniaxial stretched film. Thereafter, while holding the both ends of the uniaxially stretched film with clips, the uniaxially stretched film is guided to a preheating zone of 110° C. in the tenter and subsequently stretched 3.5 times at 120° C. in the direction perpendicular to the lengthwise direction (lateral direction). Subsequently, the film was subjected to heat treatment at 200° C. in a heat treatment zone in the tenter, uniformly cooled gradually, and then wind up on a roll to obtain a white film. The mass ratio of the layers (X/Y/X) of the white film was 1:8:1.

Using a forming machine made in Asano Laboratories Co., Ltd. (FKS-0631-20), with a far-infrared heater at 400° C., the film was heated so that the film surface temperature became 150° C. or more, and vacuum and pressure forming (pressure: 1 MPa) was performed along a mold heated to 50° C. The mold was designed so that forming in the shapes of (A) to (J) could be performed.

Example 20

A white film was obtained in the same manner as Example 3. The obtained white film was subjected to off-annealing in a condition of 180° C. for 60 seconds.

Using a forming machine made in Asano Laboratories Co., Ltd. (FKS-0631-20), with a far-infrared heater at 400° C., the film was heated so that the film surface temperature became 150° C. or more, and vacuum and pressure forming (pressure: 1 MPa) was performed along a mold heated to 50° C. The mold was designed so that forming in the shape of (B) could be performed.

Comparative Example 1

A commercially available white sheet having a thickness of 500 μm "MCPET-RB" was used.

Using a forming machine made in Asano Laboratories Co., Ltd. (FKS-0631-20), with a far-infrared heater at 400° C., the film was heated so that the film surface temperature became 150° C. or more, and vacuum and pressure forming (pressure: 1 MPa) was performed along a mold heated to 50° C. The mold was designed so that forming in the shape of (A) could be performed, but the forming was insufficient and the film could not follow the mold.

Comparative Example 5

After the raw materials of the composition shown in Tables 1 and 2 were vacuum-dried at a temperature of 180° C. for 6 hours, the raw material of the core layer (Y) was supplied to the main extruder, melt-extruded at a temperature of 280° C., and then filtered with a 30 μm cut filter. The raw material of the surface layers (X) was supplied to the sub-extruder, melt-extruded at a temperature of 280° C., and then filtered with a 30 μm cut filter. Thereafter, the surface layers (X) were combined so as to be laminated on both surface layers of the core layer (Y) (X/Y/X) in a T die multiple nozzle. The mass ratio of the discharge amounts of the main extruder and the sub-extruder was 4:1.

Then, the resultant was extruded into a molten sheet, and the molten sheet was cooled and solidified in a close contact state on a drum maintained at a surface temperature of 25° C. by an electrostatic application method to obtain an unstretched film. Subsequently, stretching in the lengthwise direction and the lateral direction was tried, but a film could not be obtained due to breakage.

TABLE 1

| | | Core layer | | | | | | |
|---|---|---|---|---|---|---|---|---|
| | | (Mass %) | | (Mass %) | | (Mass %) | | (Mass %) |
| Example 1 | PET resin (a) | 48.0 | — | — | COC resin (e) | 8.0 | Barium sulfate 50 mass % master (f) | 24.0 |
| Example 2 | PET resin (a) | 40.0 | Copolymerized polyester resin (b) | 8.0 | COC resin (e) | 8.0 | Barium sulfate 50 mass % master (f) | 24.0 |
| Example 3 | PET resin (a) | 36.0 | Copolymerized polyester resin (b) | 12.0 | COC resin (e) | 8.0 | Barium sulfate 50 mass % master (f) | 24.0 |
| Example 4 | PET resin (a) | 24.0 | Copolymerized polyester resin (b) | 24.0 | COC resin (e) | 8.0 | Barium sulfate 50 mass % master (f) | 24.0 |
| Example 5 | PET resin (a) | 36.0 | Copolymerized polyester resin (c) | 12.0 | COC resin (e) | 8.0 | Barium sulfate 50 mass % master (f) | 24.0 |
| Example 6 | PET resin (a) | 24.0 | Copolymerized polyester resin (c) | 24.0 | COC resin (e) | 8.0 | Barium sulfate 50 mass % master (f) | 24.0 |
| Example 7 | PET resin (a) | 44.0 | Copolymerized polyester resin (d) | 4.0 | COC resin (e) | 8.0 | Barium sulfate 50 mass % master (f) | 24.0 |
| Example 8 | PET resin (a) | 40.0 | Copolymerized polyester resin (d) | 8.0 | COC resin (e) | 8.0 | Barium sulfate 50 mass % master (f) | 24.0 |
| Example 9 | PET resin (a) | 36.0 | Copolymerized polyester resin (b) | 12.0 | COC resin (e) | 8.0 | Barium sulfate 50 mass % master (f) | 24.0 |
| Example 10 | PET resin (a) | 36.0 | Copolymerized polyester resin (b) | 12.0 | COC resin (e) | 8.0 | Barium sulfate 50 mass % master (f) | 24.0 |
| Example 11 | PET resin (a) | 36.0 | Copolymerized polyester resin (b) | 12.0 | COC resin (e) | 8.0 | Barium sulfate 50 mass % master (f) | 24.0 |
| Example 12 | PET resin (a) | 36.0 | Copolymerized polyester resin (b) | 12.0 | COC resin (e) | 8.0 | Barium sulfate 50 mass % master (f) | 24.0 |
| Example 13 | PET resin (a) | 36.0 | Copolymerized polyester resin (b) | 12.0 | COC resin (e) | 8.0 | Barium sulfate 50 mass % master (f) | 24.0 |
| Example 14 | PET resin (a) | 36.0 | Copolymerized polyester resin (b) | 12.0 | COC resin (e) | 8.0 | Barium sulfate 50 mass % master (f) | 24.0 |
| Example 15 | PET resin (a) | 36.0 | Copolymerized polyester resin (b) | 12.0 | COC resin (e) | 8.0 | Barium sulfate 50 mass % master (f) | 24.0 |
| Example 16 | PET resin (a) | 48.0 | Copolymerized polyester resin (b) | 12.0 | COC resin (e) | 8.0 | Barium sulfate 50 mass % master (f) | 12.0 |
| Example 17 | PET resin (a) | 20.0 | Copolymerized polyester resin (b) | 12.0 | COC resin (e) | 8.0 | Barium sulfate 50 mass % master (f) | 40.0 |
| Example 18 | PET resin (a) | 36.0 | Copolymerized polyester resin (b) | 12.0 | COC resin (e) | 8.0 | Calcium carbonate 50 mass % master (g) | 24.0 |
| Example 19 | PET resin (a) | 28.0 | Copolymerized polyester resin (b) | 12.0 | COC resin (e) | 16.0 | Barium sulfate 50 mass % master (f) | 24.0 |
| Example 20 | PET resin (a) | 36.0 | Copolymerized polyester resin (b) | 12.0 | COC resin (e) | 8.0 | Barium sulfate 50 mass % master (f) | 24.0 |
| Comparative Example 1 | MCPET | 100.0 | — | — | — | — | — | — |
| Comparative Example 2 | PET resin (a) | 48.0 | — | — | COC resin (e) | 8.0 | Barium sulfate 50 mass % master (f) | 24.0 |
| Comparative Example 3 | PET resin (a) | 48.0 | — | — | COC resin (e) | 8.0 | Barium sulfate 50 mass % master (f) | 24.0 |
| Comparative Example 4 | PET resin (a) | 56.0 | Copolymerized polyester resin (d) | 8.0 | COC resin (e) | 16.0 | — | — |
| Comparative Example 5 | PET resin (a) | 12.0 | Copolymerized polyester resin (b) | 12.0 | COC resin (e) | 16.0 | Barium sulfate 50 mass % master (f) | 40.0 |

TABLE 2

| | | Surface layer | | NPG* | Inorganic particle content | Total amount of inorganic particles + thermoplastic resin (B) |
|---|---|---|---|---|---|---|
| | | (Mass %) | | (Mass %) | mol % | (Mass %) | (Mass %) |
| Example 1 | PET resin (a) | 20.0 | — | — | 0 | 12 | 20 |
| Example 2 | PET resin (a) | 18.0 | Copolymerized polyester resin (b) | 2.0 | 2.2 | 12 | 20 |
| Example 3 | PET resin (a) | 17.0 | Copolymerized polyester resin (b) | 3.0 | 3.3 | 12 | 20 |
| Example 4 | PET resin (a) | 14.0 | Copolymerized polyester resin (b) | 6.0 | 6.7 | 12 | 20 |
| Example 5 | PET resin (a) | 17.0 | Copolymerized polyester resin (c) | 3.0 | 0 | 12 | 20 |
| Example 6 | PET resin (a) | 14.0 | Copolymerized polyester resin (c) | 6.0 | 0 | 12 | 20 |

TABLE 2-continued

| | | Surface layer | | NPG* | | Inorganic particle content | Total amount of inorganic particles + thermoplastic resin (B) |
|---|---|---|---|---|---|---|---|
| | | | (Mass %) | (Mass %) | mol % | (Mass %) | (Mass %) |
| Example 7 | PET resin (a) | 19.0 | Copolymerized polyester resin (d) | 1.0 | 0 | 12 | 20 |
| Example 8 | PET resin (a) | 18.0 | Copolymerized polyester resin (d) | 2.0 | 0 | 12 | 20 |
| Example 9 | PET resin (a) | 17.0 | Copolymerized polyester resin (b) | 3.0 | 3.3 | 12 | 20 |
| Example 10 | PET resin (a) | 17.0 | Copolymerized polyester resin (b) | 3.0 | 3.3 | 12 | 20 |
| Example 11 | PET resin (a) | 17.0 | Copolymerized polyester resin (b) | 3.0 | 3.3 | 12 | 20 |
| Example 12 | PET resin (a) | 17.0 | Copolymerized polyester resin (b) | 3.0 | 3.3 | 12 | 20 |
| Example 13 | PET resin (a) | 17.0 | Copolymerized polyester resin (b) | 3.0 | 3.3 | 12 | 20 |
| Example 14 | PET resin (a) | 17.0 | Copolymerized polyester resin (b) | 3.0 | 3.3 | 12 | 20 |
| Example 15 | PET resin (a) | 17.0 | Copolymerized polyester resin (b) | 3.0 | 3.3 | 12 | 20 |
| Example 16 | PET resin (a) | 17.0 | Copolymerized polyester resin (b) | 3.0 | 3 | 6 | 14 |
| Example 17 | PET resin (a) | 17.0 | Copolymerized polyester resin (b) | 3.0 | 3.5 | 20 | 28 |
| Example 18 | PET resin (a) | 17.0 | Copolymerized polyester resin (b) | 3.0 | 3.3 | 12 | 20 |
| Example 19 | PET resin (a) | 17.0 | Copolymerized polyester resin (b) | 3.0 | 3.5 | 12 | 28 |
| Example 20 | PET resin (a) | 17.0 | Copolymerized polyester resin (b) | 3.0 | 3.5 | 12 | 20 |
| Comparative Example 1 | — | — | — | — | 0 | 0 | 0 |
| Comparative Example 2 | PET resin (a) | 20.0 | — | — | 0 | 12 | 20 |
| Comparative Example 3 | PET resin (a) | 20.0 | — | — | 0 | 12 | 20 |
| Comparative Example 4 | PET resin (a) | 18.0 | Copolymerized polyester resin (d) | 2.0 | 0 | 0 | 16 |
| Comparative Example 5 | PET resin (a) | 17.0 | Copolymerized polyester resin (b) | 3 | 3.5 | 20 | 36 |

*NPG: neopentyl glycol

TABLE 3

| | Tray shape | | | | | | | | Dimensional stability Shrinkage factor at 90° C. for 30 minutes | |
|---|---|---|---|---|---|---|---|---|---|---|
| | Shape | Depth (mm) | Area of smallest square or rectangule surrounding tray shape (mm²) | Area of bottom portion (mm²) | Ratio of bottom portion (%) | Maximum thickness D (μm) | Specific gravity | Minimum thickness d/maximum thickness D | Optical unevenness | Depth direction | Horizontal direction |
| Example 1 | B | 3 | 900 | 324 | 36 | 201 | 0.75 | 0.64 | ○ | 4.3 | 0.4 |
| Example 2 | B | 3 | 900 | 324 | 36 | 200 | 0.73 | 0.67 | ○ | 2.6 | 0.2 |
| Example 3 | B | 3 | 900 | 324 | 36 | 200 | 0.74 | 0.67 | ○ | 2.3 | 0.2 |
| Example 4 | B | 3 | 900 | 324 | 36 | 199 | 0.77 | 0.64 | ○ | 1.8 | 0.3 |
| Example 5 | B | 3 | 900 | 324 | 36 | 200 | 0.76 | 0.68 | ○ | 6.7 | 0.1 |
| Example 6 | B | 3 | 900 | 324 | 36 | 202 | 0.78 | 0.66 | ○ | 7.5 | 0 |
| Example 7 | B | 3 | 900 | 324 | 36 | 201 | 0.77 | 0.67 | ○ | 4.8 | 0.3 |
| Example 8 | B | 3 | 900 | 324 | 36 | 200 | 0.77 | 0.67 | ○ | 5.5 | 0.3 |
| Example 9 | A | 3 | 900 | 225 | 25 | 201 | 0.75 | 0.68 | ○ | 2.1 | 0.2 |
| Example 10 | C | 3 | 900 | 441 | 49 | 202 | 0.75 | 0.56 | ⊙ | 2.5 | 0.1 |
| Example 11 | D | 1 | 900 | 324 | 36 | 200 | 0.76 | 0.87 | ○ | 1.8 | 0.2 |
| Example 12 | E | 5 | 900 | 324 | 36 | 199 | 0.77 | 0.59 | ○ | 3 | 0.3 |
| Example 13 | F | 10 | 6,400 | 3,600 | 56 | 200 | 0.78 | 0.54 | ⊙ | 5.4 | 0.1 |
| Example 14 | G | 3 | 3,118 | 1,122 | 36 | 200 | 0.75 | 0.70 | ○ | 2.2 | 0.3 |
| Example 15 | H | 3 | 900 | 254 | 28 | 202 | 0.75 | 0.64 | ○ | 2 | 0.2 |
| Example 16 | B | 3 | 900 | 324 | 36 | 195 | 0.86 | 0.58 | ○ | 2.9 | 0.2 |
| Example 17 | B | 3 | 900 | 324 | 36 | 215 | 0.63 | 0.75 | ○ | 2.1 | 0.1 |

TABLE 3-continued

| | | | Tray shape | | | | | | | Dimensional stability Shrinkage factor at 90° C. for 30 minutes | |
|---|---|---|---|---|---|---|---|---|---|---|---|
| | Shape | Depth (mm) | Area of smallest square or rectangule surrounding tray shape (mm$^2$) | Area of bottom portion (mm$^2$) | Ratio of bottom portion (%) | Maximum thickness D (μm) | Specific gravity | d/maximum thickness D | Optical unevenness | Depth direction | Horizontal direction |
| Example 18 | B | 3 | 900 | 324 | 36 | 208 | 0.70 | 0.72 | ○ | 2.1 | 0.2 |
| Example 19 | B | 3 | 900 | 324 | 36 | 191 | 0.68 | 0.52 | ○ | 3.5 | 0.2 |
| Example 20 | B | 3 | 900 | 324 | 36 | 202 | 0.77 | 0.69 | ○ | 1.4 | 0 |
| Comparative Example 1 | A | 3 | 900 | 190 | 21 | 485 | 0.35 | 0.95 | X | 3.5 | 0.8 |
| Comparative Example 2 | I | 5 | 900 | 576 | 64 | 200 | 0.81 | 0.47 | ⊙ | 11.5 | 0.2 |
| Comparative Example 3 | J | 25 | 6,400 | 3,600 | 56 | 201 | 0.80 | 0.43 | ⊙ | 12 | 1.2 |
| Comparative Example 4 | B | 3 | 900 | 324 | 36 | 184 | 0.91 | 0.45 | XX | 5.1 | 0.5 |
| Comparative Example 5 | — | — | — | — | — | — | — | — | — | — | — |

INDUSTRIAL APPLICABILITY

According to the present invention, it is possible to provide a reflector having tray shapes excellent in shape retention, and in particular, it is possible to provide a reflector having tray shapes which change little even when exposed to a moist heat environment for a long period of time and is suitable for a direct type backlight unit, an LED lighting unit, and an illumination for a plant factory.

The invention claimed is:

1. A reflector comprising a plurality of independent tray shapes with a depth of 1 mm or more and 20 mm or less, wherein
a ratio d/D of a minimum film thickness d to a maximum film thickness D of the reflector is 0.5 or more and 0.9 or less, and
a main component of the reflector is a copolymerized polyester having a diol component that contains 1 to 20 mol % of 2,2-dimethyl-1,3-propanediol.

2. The reflector according to claim 1, wherein a ratio of a bottom portion of one independent tray shape to a horizontal projected area of a smallest square or rectangle surrounding one independent tray shape is 30% or more.

3. The reflector according to claim 1, wherein a specific gravity of the reflector is 0.5 or more and 1.1 or less.

4. The reflector according to claim 1, wherein the reflector contains air bubbles including nuclei of inorganic particles.

5. The reflector according to claim 1, wherein the reflector includes at least three layers.

6. An LED lighting unit that comprises one or more LEDs and the reflector according to claim 1.

7. A direct-type LED backlight unit that comprises one or more LEDs and the reflector according to claim 1.

8. The reflector according to claim 1, wherein a content of inorganic particles in 100% by mass of the reflector is 5% by mass or more.

9. The reflector according to claim 1, wherein the reflector contains a thermoplastic resin (B) incompatible with polyester and inorganic particles, and a total amount of the thermoplastic resin (B) and the inorganic particles in 100% by mass of the reflector is 30% by mass or less.

* * * * *